(12) United States Patent
Min et al.

(10) Patent No.: US 11,749,866 B2
(45) Date of Patent: Sep. 5, 2023

(54) SECONDARY BATTERY

(71) Applicant: LG Chem, Ltd., Seoul (KR)

(72) Inventors: Geon Woo Min, Daejeon (KR); Je Jun Lee, Daejeon (KR); Sang Suk Jung, Daejeon (KR)

(73) Assignee: LG Energy Solution, Ltd.

( * ) Notice: Subject to any disclaimer, the term of this patent is extended or adjusted under 35 U.S.C. 154(b) by 194 days.

(21) Appl. No.: 17/259,395

(22) PCT Filed: Nov. 13, 2019

(86) PCT No.: PCT/KR2019/015396
§ 371 (c)(1),
(2) Date: Jul. 16, 2021

(87) PCT Pub. No.: WO2020/111591
PCT Pub. Date: Jun. 4, 2020

(65) Prior Publication Data
US 2021/0336309 A1 Oct. 28, 2021

(30) Foreign Application Priority Data
Nov. 28, 2018 (KR) .................. 10-2018-0149369

(51) Int. Cl.
*H01M 50/342* (2021.01)
*H01M 50/107* (2021.01)
(Continued)

(52) U.S. Cl.
CPC ..... *H01M 50/3425* (2021.01); *H01M 50/107* (2021.01); *H01M 50/578* (2021.01); *H01M 50/574* (2021.01); *H01M 2200/20* (2013.01)

(58) Field of Classification Search
None
See application file for complete search history.

(56) References Cited

U.S. PATENT DOCUMENTS 10,090,497 B2  10/2018  Kim et al.
2005/0214641 A1  9/2005  Kim
(Continued)

FOREIGN PATENT DOCUMENTS

CN  102473883 A  5/2012
CN  103155225 A  6/2013
(Continued)

OTHER PUBLICATIONS

Extended European Search Report for Application No. EP 19889598.9, dated Aug. 17, 2021, 8 pages.
(Continued)

*Primary Examiner* — Lisa S Park
(74) *Attorney, Agent, or Firm* — Lerner David LLP

(57) ABSTRACT

The present invention relates to a secondary battery capable of improving venting pressure distribution. A secondary battery including an electrode assembly, a can member that accommodates the electrode assembly, and a top cap assembly that covers an opening of the can member. The top cap assembly includes a top cap positioned at the uppermost portion and a safety vent part positioned below the top cap. The safety vent part includes a rupture portion that is ruptured when an internal pressure within the can member equals or exceeds a predetermined pressure, a rupture notch portion that defines a boundary of the rupture portion, and a bending notch portion which is spaced apart from the rupture notch portion toward a center of the rupture portion on a bottom surface of the rupture portion, and the bending notch portion is bent when the internal pressure within the can member increases.

12 Claims, 11 Drawing Sheets

(51) Int. Cl.
*H01M 50/578* (2021.01)
*H01M 50/574* (2021.01)
*H01M 50/56* (2021.01)
*H01M 50/152* (2021.01)
*H01M 50/116* (2021.01)

(56) References Cited

U.S. PATENT DOCUMENTS

| | | | |
|---|---|---|---|
| 2010/0086835 | A1 | 4/2010 | Kim |
| 2011/0008654 | A1 | 1/2011 | Kim et al. |
| 2011/0200854 | A1 | 8/2011 | Bak et al. |
| 2012/0114979 | A1* | 5/2012 | Kim .............. H01M 50/3425 429/7 |
| 2013/0216871 | A1 | 8/2013 | Lee et al. |

FOREIGN PATENT DOCUMENTS

| | | | |
|---|---|---|---|
| EP | 2175507 | A1 | 4/2010 |
| GA | 2572931 | A1 | 6/2008 |
| JP | H06215746 | * | 1/1993 |
| JP | H06215746 | A | 8/1994 |
| JP | H08339793 | A | 12/1996 |
| JP | 2001102038 | A | 4/2001 |
| JP | 2013502035 | A | 1/2013 |
| KR | 100578805 | B1 | 5/2006 |
| KR | 20100038054 | A | 4/2010 |
| KR | 101058386 | B1 | 8/2011 |
| KR | 20110095118 | A | 8/2011 |
| KR | 20150035267 | A | 4/2015 |
| KR | 20170124343 | A | 11/2017 |
| WO | 2018030836 | A1 | 2/2018 |
| WO | WO2018/030836 | * | 2/2018 |

OTHER PUBLICATIONS

Search Report dated Jun. 22, 2022 from the Office Action for Chinese Application No. 201980046222.8 dated Jun. 30, 2022, 3 pages.
International Search Report for Application No. PCT/KR2019/015396, dated Feb. 20, 2020, pp. 1-2.

* cited by examiner

SECONDARY BATTERY

CROSS-REFERENCE TO RELATED APPLICATION

The present application is a national phase entry under 35 U.S.C. § 371 of PCT/KR2019/015396, filed on Nov. 13, 2019 and claims the benefit of the priority of Korean Patent Application No. 10-2018-0149369, filed on Nov. 28, 2018, which are hereby incorporated by reference in their entirety.

TECHNICAL FIELD

The present invention relates to a secondary battery, and more particularly, to a secondary battery capable of improving venting pressure distribution.

BACKGROUND ART

Batteries (cells) that generate electric energy through physical or chemical reaction of materials to supply power to the outside are used when alternate current (AC) power to be supplied to the building is not obtained, or direct current (DC) power is required according to the living environments surrounded by various electrical/electronic devices.

Among such batteries, primary batteries and secondary batteries, which are chemical cells using chemical reaction, are being generally used. The primary batteries are consumable cells which are collectively referred to as dry cells. Also, the secondary batteries are rechargeable batteries manufactured by using a material in which oxidation and reduction processes between current and a material are capable of being repeated several times. That is, power is recharged when the reduction reaction to the material is performed by the current, and power is discharged when the oxidation reaction to the material is performed. The recharging and discharging are repeatedly performed to generate electricity.

A lithium ion battery among the secondary batteries is manufactured in such a manner in which: an active material is applied, with a predetermined thickness, to each of a positive electrode conductive foil and a negative electrode conductive foil; a separator is disposed between both the conductive foils so as to be wound several times in an approximate jelly roll or cylindrical shape and thereby to manufacture an electrode assembly; and the electrode assembly is accommodated in a cylindrical or prismatic can, a pouch, or the like and is sealed.

A secondary battery according to the related art is disclosed in Korean Patent Publication No. 10-2011-0095118.

In the secondary battery, an internal gas is vented to the outside through a top cap assembly when an internal pressure increases, and the top cap assembly includes a safety vent for venting the internal gas.

Such a safety vent has a structure in which a notch defined in a vent flange part disposed between the top cap assembly and a can is cut when the internal pressure within the can increases, and thus a passage for venting the gas is provided.

Particularly, a certain component, such as the safety vent, in a circular battery induces venting to prevent the battery from being exploded and ignited when an abnormal accident such as overcharging occurs.

Such a safety vent may cause a safety problem when the venting is not induced at a pre-designed venting pressure.

Also, a top cap interferes with the safety vent according to the related art during measurement of a venting pressure before the notch of the safety vent is cut, and thus the venting may be delayed.

DISCLOSURE OF THE INVENTION

Technical Problem

Accordingly, the present invention has been made to solve the above problem, and an object of the present invention is to provide a secondary battery in which the interference with a top cap is prevented to be able to improve the venting pressure distribution.

Technical Solution

A secondary battery according to an embodiment of the present invention includes: an electrode assembly; a can member that accommodates the electrode assembly therein; and a top cap assembly that covers an opening of the can member, wherein the top cap assembly includes a top cap positioned at the uppermost portion and a safety vent part positioned below the top cap, wherein the safety vent part includes: a rupture portion ruptured when an internal pressure within the can member increases to a predetermined pressure or more; a rupture notch portion that defines a boundary of the rupture portion; and a bending notch portion which is disposed at a position spaced apart from the rupture notch portion toward a center of the rupture portion on a bottom surface of the rupture portion facing the inside of the can member, wherein the bending notch portion is bent when the internal pressure within the can member increases.

The rupture notch portion may be recessed from a lower surface of the safety vent part, and the bending notch portion may be recessed from the lower surface of the safety vent part, wherein a recessed depth of the bending notch portion is less than that of the rupture notch portion.

The rupture notch portion may be provided in the bottom surface of the rupture portion.

The top cap assembly may further include a current interrupt device provided with an interrupt portion which is attached to the rupture portion and ruptured to interrupt current when the internal pressure within the can member increases.

The interrupt portion of the current interrupt device may be attached to the rupture portion inside a circumference of the bending notch portion.

The bending notch portion may have a continuous circular or elliptical shape.

The bending notch portion may have a discontinuous circular or elliptical shape.

The bending notch portion may be provided in plurality, and the plurality of bending notch portions have different lengths.

The rupture notch portion may have a discontinuous circular or elliptical shape.

A connection portion between an edge portion and the rupture portion of the safety vent part may be bent upward.

The rupture portion may include: an inclined section inclined so that a height thereof gradually decreases from the connection portion toward the bending notch portion; and a horizontal section having a horizontal shape and extending from an end of the inclined section toward the center of the rupture portion, wherein the bending notch portion is positioned on a boundary between the inclined section and the horizontal section.

A spaced distance between an edge end of the safety vent part and the rupture notch portion may be equal to a spaced distance between the rupture notch portion and the bending notch portion.

Advantageous Effects

According to the present invention, the bending notch portion as well as the rupture notch portion is further provided in the bottom surface of the safety vent part, and thus the safety vent part is not interfered with the top cap when the internal pressure within the can member increases.

Also, since the safety vent part is not interfered with the top cap, the rupture notch portion stably performs the venting at the preset venting pressure, and thus the venting pressure distribution may be improved.

MODE FOR CARRYING OUT THE INVENTION

Figure 1:
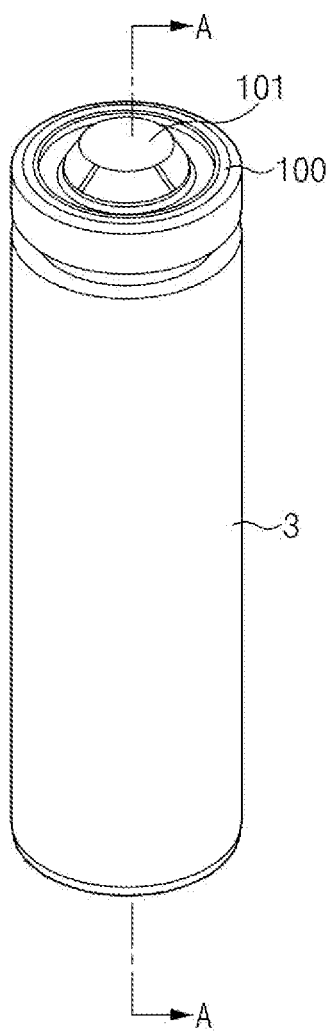
FIG. 1 is a perspective view of a secondary battery according to a first embodiment of the present invention.

Hereinafter, preferred embodiments of the present invention will now be described in detail with reference to the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Therefore, the embodiments described in this specification and the configurations illustrated in the drawings are only preferred embodiments of the present invention, and may not describe the technical idea thoroughly. Accordingly, it should be understood that various equivalents and modifications that can be substituted for the embodiments might be provided at the filing date of the present application.

In the drawings, the dimension of each of components or a specific portion constituting the component is exaggerated, omitted, or schematically illustrated for convenience and clarity of illustration. Thus, the dimension of each element does not entirely reflect an actual size. Moreover, detailed descriptions related to well-known functions or configurations will be ruled out in order not to unnecessarily obscure subject matters of the present invention.

Figure 2:
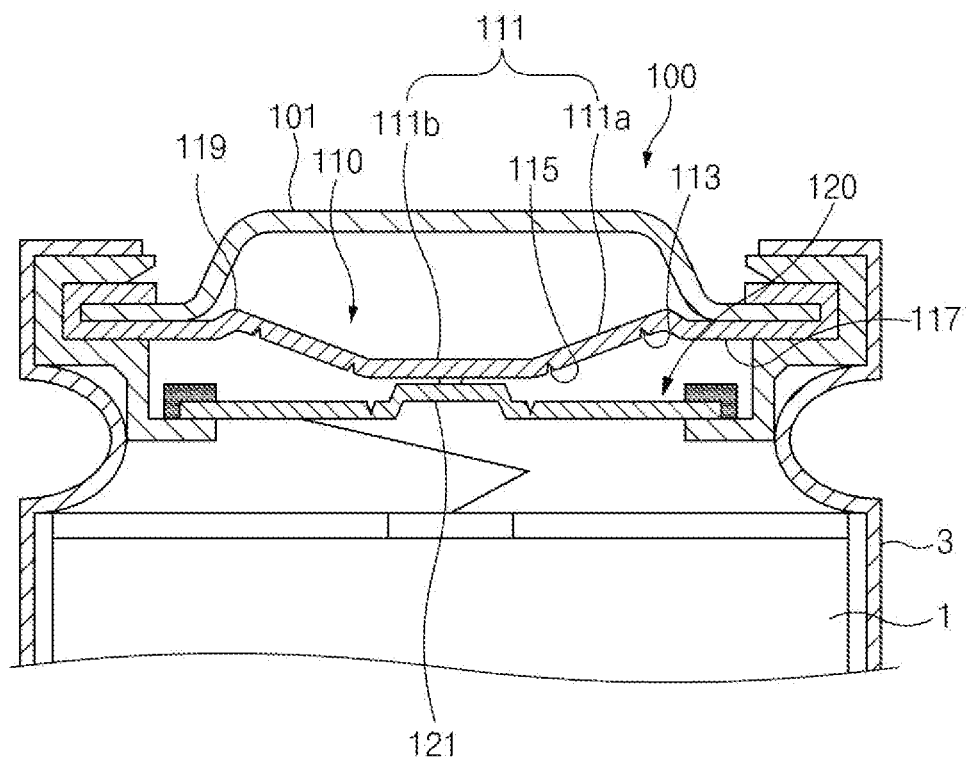
FIG. 2 is a partial cross-sectional view taken along line A-A and illustrating main parts in an upper inner portion of the secondary battery.

FIG. 1 is a perspective view of a secondary battery according to a first embodiment of the present invention, and FIG. 2 is a partial cross-sectional view taken along line A-A and illustrating main parts in an upper inner portion of the secondary battery.

As illustrated in FIGS. 1 and 2, a secondary battery according to the embodiment includes an electrode assembly 1, a can member 3 for accommodating the electrode assembly 1 therein, and a top cap assembly 100 for covering an opening of the can member 3. The top cap assembly 100 includes a top cap 101 positioned at the uppermost portion and a safety vent part 110 positioned below the top cap 101. The safety vent part 110 includes a rupture portion 111 which ruptures when an internal pressure within the can member 3 increases to a predetermined pressure or more, a rupture notch portion 113 that defines a boundary of the rupture portion 111, and a bending notch portion 115 which is disposed at a position spaced apart from the rupture notch portion 113 toward a center of the rupture portion 111 on a bottom surface of the rupture portion 111 facing the inside of the can member 3. The bending notch portion 115 is bent when the internal pressure within the can member 3 increases.

The electrode assembly 1 may be manufactured by stacking, multiple times, a positive electrode coated with a positive electrode active material, a negative electrode coated with a negative electrode active material, and a separator interposed between the negative electrode and the positive electrode.

Also, the electrode assembly 1 may be manufactured by winding, in a jelly roll structure, a stack body in which the positive electrodes, the separators, and the negative electrodes are stacked on each other.

The can member 3 is a metal container having an open top surface of an approximately cylindrical structure in a cylindrical lithium ion secondary battery or a metal container having an open top surface of an approximately prismatic structure in a prismatic lithium ion secondary battery. The can member 3 is made of aluminum or an aluminum alloy that is generally lightweight and easy to manage corrosion.

The can member 3 serves as a container for the electrode assembly 1 and an electrolyte (not shown). The electrode assembly 1 is inserted into the can member 3 via an upper open end, i.e., an upper end that is open in the can member 3, and then the upper open end of the can member 3 is sealed by the top cap assembly 100.

The top cap assembly 100 may further include a current interrupt device 120 provided with an interrupt portion 121 which is configured to be ruptured to interrupt current when an internal pressure within the can member 3 increases.

Figure 3:
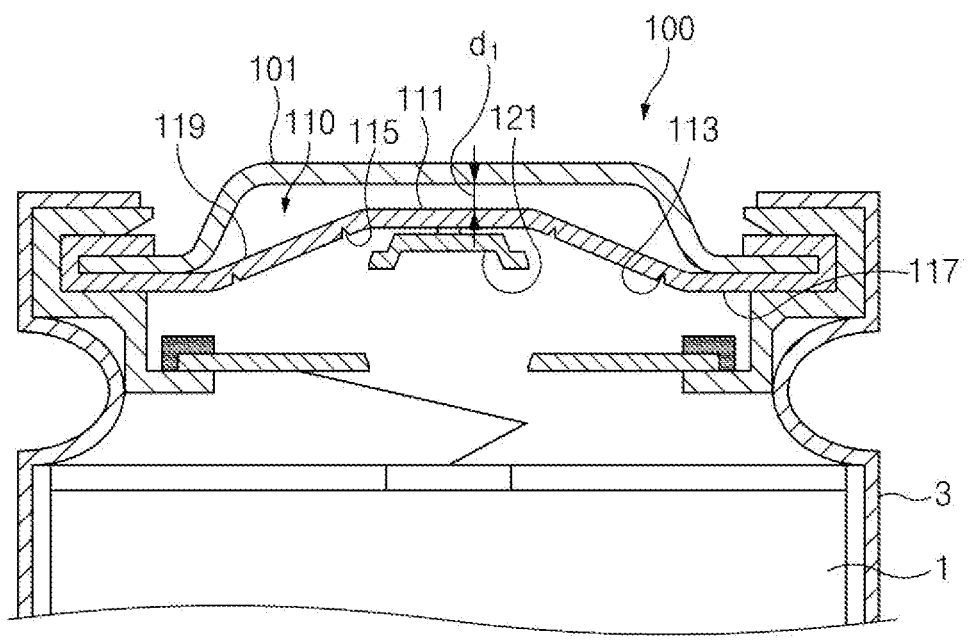
FIG. 3 is a view illustrating a state of use in which an interrupt portion is ruptured from a current interrupt device due to an increase in the internal pressure of a can member of FIG. 2.

FIG. 3 is a view illustrating a state of use in which the interrupt portion is ruptured from the current interrupt device due to an increase in the internal pressure of the can member of FIG. 2.

Referring to FIG. 3, the interrupt portion 121 of the current interrupt device 120 is attached to the rupture portion 111 of the safety vent part 110. The rupture portion 121 is ruptured from the current interrupt device 120 and moves upward toward the top cap 101 of the top cap assembly 100, together with the rupture portion 111 of the safety vent part 110.

According to the present invention, the rupture portion 121 of the current interrupt device 120 may be attached to the center in the rupture portion 111 inside a circumference of the bending notch portion 115.

The rupture notch portion 113 of the safety vent part 110 is recessed from the surface of the safety vent part 110 so as to be cut when the internal pressure within the can member 3 increases.

The rupture notch portion 113 may be defined in one of a top surface and a bottom surface of the safety vent part 110. In a case in which the rupture notch portion 113 is provided in the bottom surface of the safety vent part 110 facing the inside of the can member 3, it may be advantageous to secure a spaced distance d to the top cap 101 when the safety vent part 110 rises upward due to the internal pressure within the can member 3.

Similar to the rupture notch portion 113, the bending notch portion 115 is concavely indented (or grooved) from the surface of the safety vent part 110. The recessed depth of the bending notch portion 115 is less than the recessed depth of the rupture notch portion 113.

This may be done for maintaining a thickness of a notch to a thickness not allowing the notch to be cut, and thus the bending notch portion 115 is not cut but bent due to the internal pressure within the can member 3.

Also, the bending notch portion 115 is provided in the bottom surface of the safety vent part 110, and thus the spaced distance d to the top cap 101 may be secured when the safety vent part 110 is moved upward due to the internal pressure within the can member 3.

Figure 4:
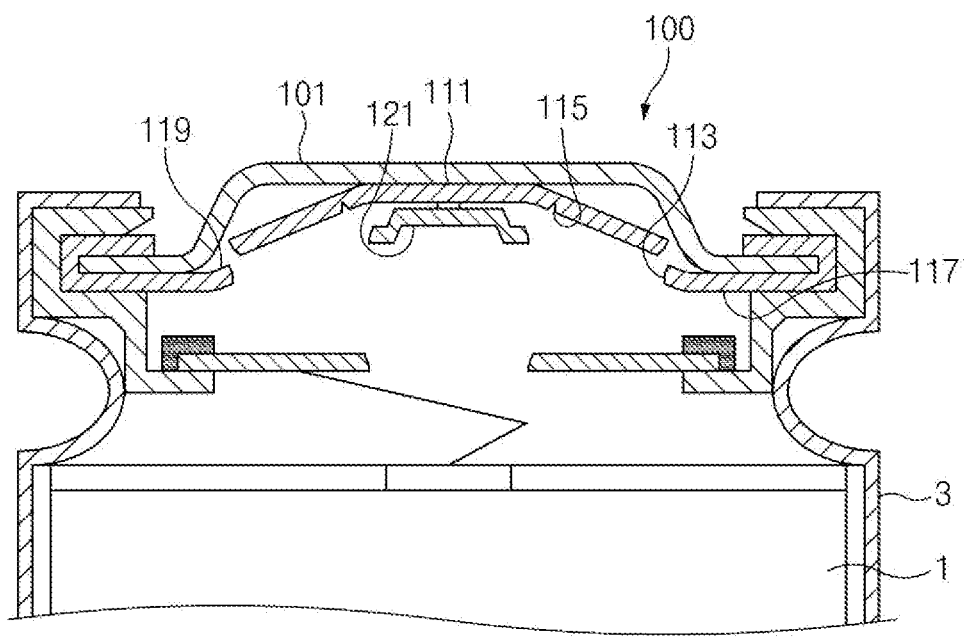
FIG. 4 is a view illustrating a state of use in which a rupture notch portion of a safety vent part of FIG. 3 is cut to provide venting.

FIG. 4 is a view illustrating a state of use in which the rupture notch portion of the safety vent part of FIG. 3 is cut to provide venting.

As illustrated in FIG. 4, in a case in which the spaced distance d to the top cap 101 is secured by the bending of the bending notch portion 115 provided in the bottom surface of the safety vent part 110 when the safety vent part 110 is moved upward due to the internal pressure inside the can member 3, the rupture notch portion 113 is cut at a preset venting pressure, and thus the gas within the can member 3 may be safely vented to the outside.

Figure 5:
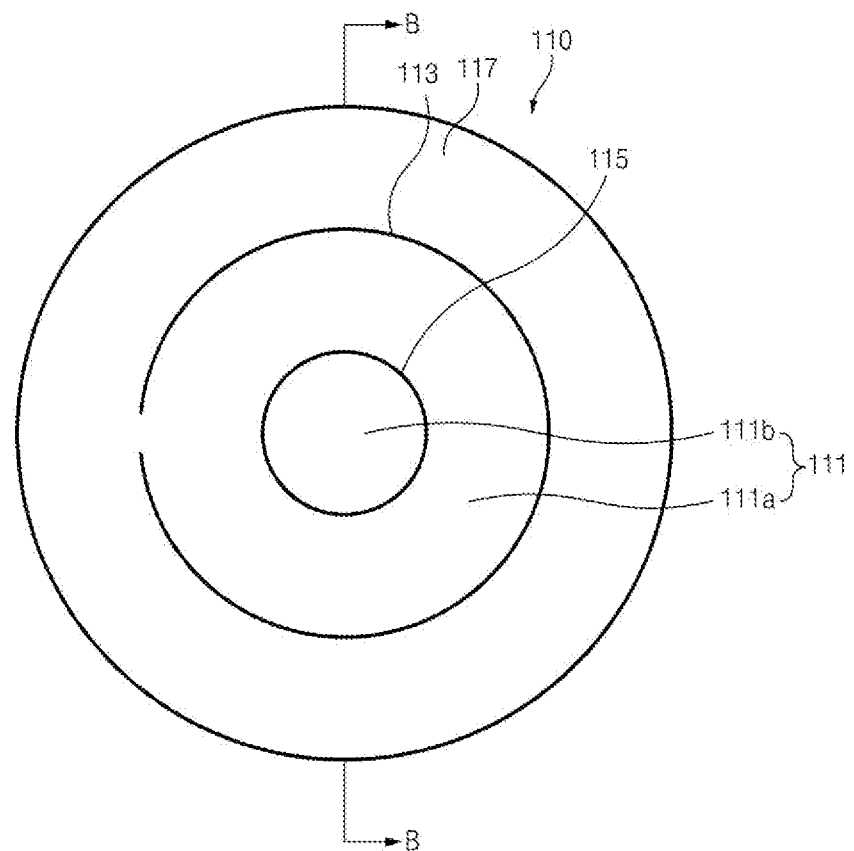
FIG. 5 is a bottom view illustrating only the safety vent part according to the first embodiment of the present invention.

FIG. 5 is a bottom view illustrating only the safety vent part according to the first embodiment of the present invention.

According to the embodiment of the present invention as illustrated in FIG. 5, the rupture notch portion 113 may have a discontinuous circular or elliptical shape in the bottom surface of the safety vent part 110.

As described above, the rupture notch portion 113 may be provided corresponding to the bottom surface of the safety vent part 110. That is, when the bottom surface of the safety vent part 110 has a circular shape, the rupture notch portion 113 may also have the circular shape, and when the bottom surface of the safety vent part 110 has an elliptical shape, the rupture notch portion 113 may also have the elliptical shape.

The bending notch portion 115 may have a continuous circular or elliptical shape in the bottom surface of the safety vent part 110.

Similar to the rupture notch portion 113, the bending notch portion 115 may also be provided corresponding to the bottom surface of the safety vent part 110.

Also, the bending notch portion 115 has a smaller circumferential size than the rupture notch portion 113, and thus may be provided in the bottom surface of the safety vent part 110 inside a circumference of the rupture notch portion 113.

Here, if a spaced distance between an edge end on the bottom surface of the safety vent part 110 and the rupture notch portion 113 is equal, without being biased to the one side, to a spaced distance between the rupture notch portion 113 and the bending notch portion 115 when viewed from the bottom surface of the safety vent part 110, the spaced gap between the safety vent part 110 and the top cap 101 may be most effectively secured when the safety vent part 110 is moved upward due to the internal pressure within the can member 3.

Figure 6:
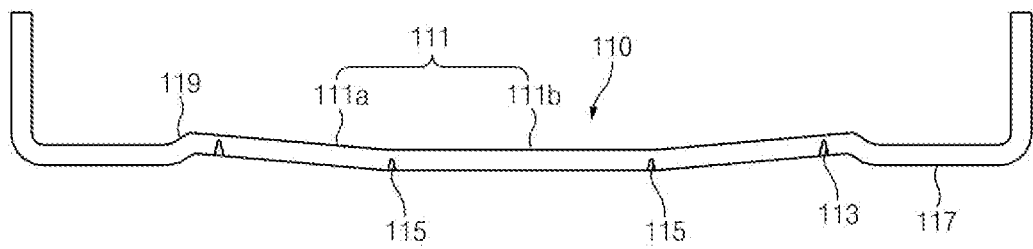
FIG. 6 is a cross-sectional view taken along line B-B of FIG. 5.

FIG. 6 is a cross-sectional view taken along line B-B of FIG. 5.

As illustrated in FIG. 6, in the secondary battery according to the embodiment of the present invention, a connection portion 119 between an edge portion 117 and the rupture portion 111 of the safety vent part 110 may be bent upward.

That is, since the connection portion 119 is bent upward, although the safety vent part 110 is moved upward due to the internal pressure within the can member 3, the rupture notch portion 113 is not easily cut, and the safety vent part 110 may be moved upward.

The rupture portion 111 may include an inclined section 111a which is inclined so that a height thereof gradually decreases from the connection portion 119 toward the bending notch portion 115.

Also, the rupture portion 111 may include a horizontal section 111b having a horizontal shape and extending from an end of the inclined section 111a toward the center of the rupture portion 111.

Also, the bending notch portion 115 may be positioned on a boundary between the inclined section 111a and the horizontal section 111b.

That is, as the inclined section 111a is inclined so that a height thereof gradually decreases toward the horizontal section 111b, an increase in the height of the connection portion 119 by being bent upward is compensated. Thus, the horizontal section 111b of the rupture portion 111 is allowed to be in a lowermost position so as to maintain the horizontal level.

As described above, the horizontal section 111b of the rupture portion 111 may be positioned at the lowermost portion of the safety vent part 110 so as to be coupled to the interrupt portion 121 of the current interrupt device 120 installed at the lower side.

Also, when the bending notch portion 115 is positioned on the boundary between the inclined section 111a and the horizontal section 111b, it may be significantly effective in bending the bending notch portion 115 to secure an optimal spaced distance d to the top cap 101.

Figure 7:
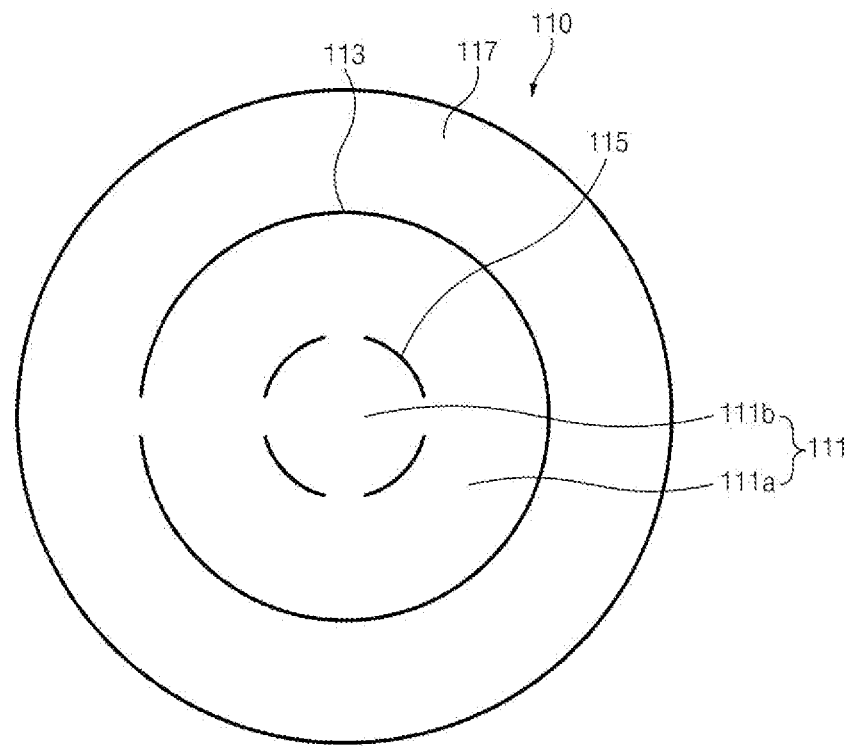
FIG. 7 is a bottom view illustrating only a safety vent part according to a second embodiment of the present invention.

FIG. 7 is a bottom view illustrating only a safety vent part according to a second embodiment of the present invention.

As illustrated in FIG. 7, in a secondary battery according to the second embodiment of the present invention, a bending notch portion 115 of a safety vent part 110 may have a discontinuous circular or elliptical shape.

When the bending notch portion 115 has the discontinuous circular or elliptical shape, a recessed region of the bending notch portion 115 may be minimized, and thus the bending notch portion 115 may be effectively prevented from being cut when an internal pressure inside a can member 3 increases.

Figure 8:
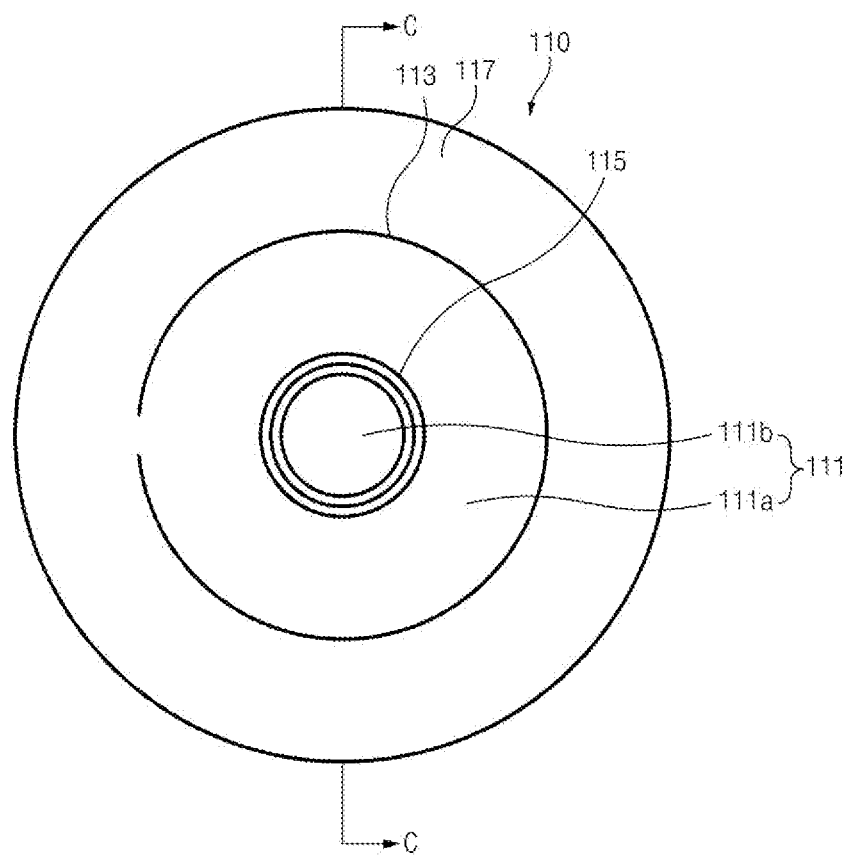
FIG. 8 is a bottom view illustrating only a safety vent part according to a third embodiment of the present invention.
Figure 9:
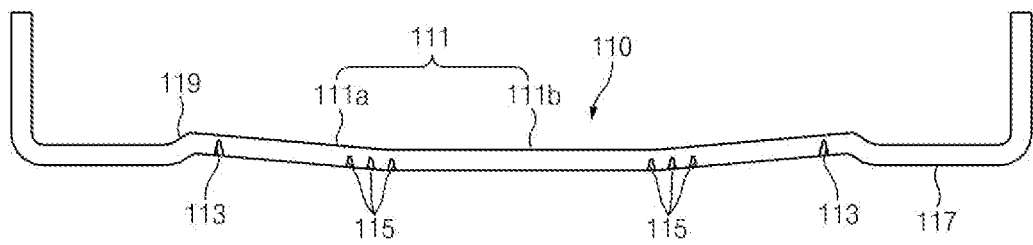
FIG. 9 is a cross-sectional view taken along line C-C of FIG. 8.

FIG. 8 is a bottom view illustrating only a safety vent part according to a third embodiment of the present invention, and FIG. 9 is a cross-sectional view taken along line C-C of FIG. 8.

As illustrated in FIGS. 8 and 9, in a secondary battery according to a third embodiment of the present invention, a plurality of bending notch portions 115 of the safety vent part 110 are provided having different lengths.

In a case in which the plurality of bending notch portions 115 are provided having different lengths, even when the safety vent part 110 rapidly rises due to an instantaneous increase in an internal pressure within the can member 3, the plurality of bending notch portions 115 may be bent to mitigate a rising impact.

That is, the rupture notch portions 113 may be prevented from being cut, at a pressure before reaching a preset venting pressure, due to the instant and sudden rising impact.

Figure 10:
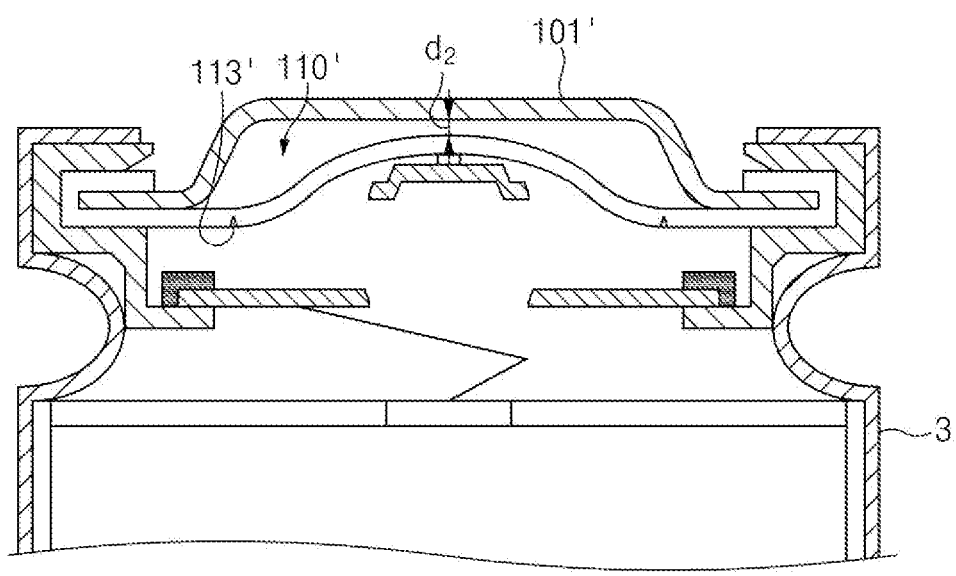
FIG. 10 is a view of a secondary battery in which a safety vent part according to the related art is installed, illustrating, on the same cross-section of FIG. 3, a state of use in which an interrupt portion is ruptured from a current interrupt device due to an increase in an internal pressure of a can member.

FIG. 10 is provided as Comparative example. FIG. 10 is a view of a secondary battery in which a safety vent part according to the related art is installed, illustrating, on the same cross-section of FIG. 3, a state of use in which an interrupt portion is ruptured from a current interrupt device due to an increase in an internal pressure of a can member.

In the secondary battery according to the related art as illustrated in FIG. 10, only a rupture notch portion 113' is provided in a safety vent part 110' without the bending notch portion of the present invention.

In such a secondary battery according to the related art, the safety vent part 110' moves toward a top cap 101' when an internal pressure within a can member 3 increases. Here, a central portion of the safety vent part 110' farthest away from an edge of the safety vent part 110' coupled to the can member 3 may rise to the uppermost side due to the internal pressure of a gas.

Thus, the central portion of the safety vent part 110' soars to the vicinity of the top cap 101', and approaches the top cap 101' until a spaced distance $d_2$ therebetween is close to approximately 123 μm. Furthermore, the central portion of the safety vent part 110' may come into contact with the top cap 101'.

A rupture notch is not cut when the spaced distance $d_2$ between the safety vent part 110' and the top cap 101' is very small, or the safety vent part 110' comes into contact with the top cap 101' as described above. That is, since the rupture notch is not cut at a preset venting pressure at which an internal gas should be vented, the venting may not be performed stably.

In this case, safety problems such as explosion, heat generation, and ignition of a secondary battery may occur.

In the secondary battery according to the embodiment of the present invention as illustrated in FIG. 3, when the internal pressure within the can member 3 increases, the safety vent part 110 moves toward the top cap 101 while the inclined section 111a of the rupture portion 111 is bent upward. When the safety vent part 110 moves toward top cap 101, the bending notch portion 115 is bent and absorbs a portion of the internal pressure within the can member 3, and thus the horizontal section 111b of the rupture portion 111 may be prevented from soaring toward top cap 101.

Thus, a spaced distance $d_1$ between the safety vent part 110 and the top cap 101 may be sufficiently secured to about 186 μm.

As the spaced distance $d_1$ between the safety vent part 110 and the top cap 101 is secured as described above, the rupture notch portion 113 is cut at a preset vent pressure, which may prevent interference with the top cap 101 and stably vent the gas within the can member 3.

Figure 11:
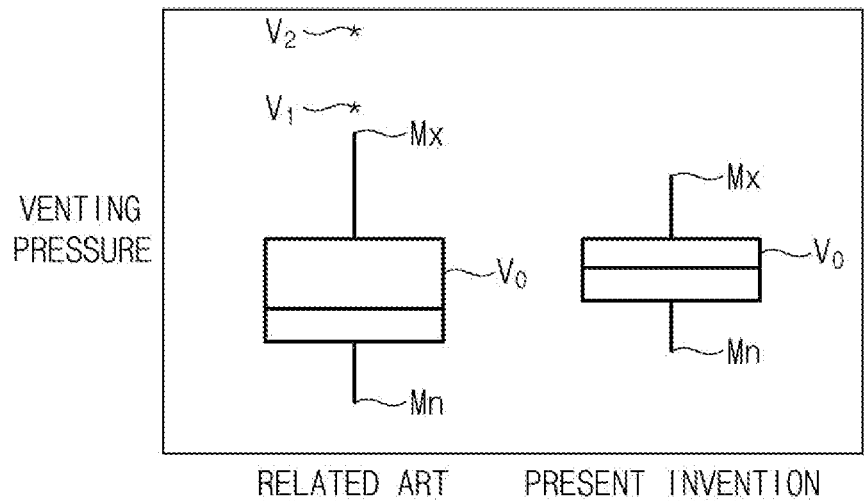
FIG. 11 shows the degrees of distribution for comparing the venting pressure distribution in the secondary battery in which the safety vent part according to the related art is installed and the venting pressure distribution in the secondary battery in which the safety vent part according to the present invention is installed.

FIG. 11 shows the degrees of distribution for comparing the venting pressure distribution in the secondary battery in which the safety vent part according to the related art is installed and the venting pressure distribution in the secondary battery in which the safety vent part according to the present invention is installed.

In FIG. 11, $V_0$ is a distribution group of venting pressures, $M_x$ is the maximum value of the venting pressures, $M_n$ is the minimum value of the venting pressures, and each of $V_1$ and $V_2$ is a portion of the venting pressure distribution.

When comparing the venting pressures of the safety vent part according to the related art in which the bending notch portion is not provided and the venting pressures of the improved safety vent part according to the present invention in which the bending notch portion is provided with reference to FIG. 11, it may be found that the venting pressure distribution of the safety vent part according to the present invention is improved as compared to the venting pressure distribution of the safety vent part according to the related art. The difference therebetween may be about 1.5 times.

Particularly, during the venting of gas within the can member in the safety vent part according to the related art, the central portion of the safety vent part comes into contact with the top cap in a state in which the rupture notch portion is not cut, and thus the venting is not properly performed at the preset venting pressure. The distribution in which the venting pressures greatly change during abnormal venting described above may be indicated as $V_1$ and $V_2$.

According to the present invention as described above, the bending notch portion as well as the rupture notch portion is further provided in the bottom surface of the safety vent, and thus the safety vent is not interfered with the top cap when the internal pressure within the can member increases.

Also, since the safety vent is not interfered with the top cap, the rupture notch portion performs the venting at the preset venting pressure, and thus the venting pressure distribution may be improved.

Although the secondary battery according to the present invention has been described with reference to the exemplary drawings as described above, the present invention is not limited to the embodiments and drawings described and illustrated above, and various embodiments may be made within the scope of the appended claims by those skilled in the art pertaining to the present invention.

The invention claimed is:

1. A secondary battery comprising:
an electrode assembly;
a can member configured to accommodate the electrode assembly therein; and
a top cap assembly configured to cover an opening of the can member,
wherein the top cap assembly comprises a top cap positioned at an uppermost portion and a safety vent part positioned below the top cap,
wherein the safety vent part comprises:
a rupture portion configured to be ruptured when an internal pressure within the can member exceeds a predetermined pressure, the rupture portion including a first section and a second section;

a rupture notch portion that defines a boundary of the rupture portion; and a bending notch portion which is disposed at a position spaced apart from the rupture notch portion toward a center of the rupture portion on a bottom surface of the rupture portion facing an inside of the can member, the bending notch portion separating the first section and the second section, wherein the bending notch portion is bent when the internal pressure within the can member increases such that the first section is moved at least partially above the bending notch portion when the internal pressure is equal to the predetermined pressure.

2. The secondary battery of claim 1, wherein the rupture notch portion is formed as a recess within a lower surface of the safety vent part, and the bending notch portion is formed as a recess within the lower surface of the safety vent part, wherein a recessed depth of the bending notch portion is less than a recessed depth of the rupture notch portion.

3. The secondary battery of claim 1, wherein the rupture notch portion is provided in the bottom surface of the rupture portion.

4. The secondary battery of claim 1, wherein the top cap assembly further comprises a current interrupt device provided with an interrupt portion which is attached to the rupture portion and which is configured to be ruptured to interrupt current when the internal pressure within the can member increases.

5. The secondary battery of claim 4, wherein the interrupt portion of the current interrupt device is attached to the rupture portion inside a circumference of the bending notch portion.

6. The secondary battery of claim 1, wherein the bending notch portion has a continuous circular or elliptical shape.

7. The secondary battery of claim 1, wherein the bending notch portion has a discontinuous circular or elliptical shape.

8. The secondary battery of claim 1, wherein the bending notch portion comprises a plurality of bending notches, and the plurality of bending notches have different lengths.

9. The secondary battery of claim 1, wherein the rupture notch portion has a discontinuous circular or elliptical shape.

10. The secondary battery of claim 1, wherein a connection portion between an edge portion and the rupture portion of the safety vent part is bent upward.

11. The secondary battery of claim 10, wherein:

the second section of the rupture portion is declined so that a height thereof gradually decreases from the connection portion toward the bending notch portion; and the first section has a horizontal shape extending from an end of the declined section toward the center of the rupture portion.

12. The secondary battery of claim 1, wherein a spaced distance between an edge end of the safety vent part and the rupture notch portion is equal to a spaced distance between the rupture notch portion and the bending notch portion.

* * * * *